United States Patent
Nguyen et al.

(10) Patent No.: US 7,822,185 B2
(45) Date of Patent: Oct. 26, 2010

(54) INSTANT CONFERENCE METHOD AND APPARATUS

(75) Inventors: Hai Duong Nguyen, Plano, TX (US);
Ranjith Weeresinghe, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1155 days.

(21) Appl. No.: 11/336,528

(22) Filed: Jan. 20, 2006

(65) Prior Publication Data
US 2007/0172045 A1    Jul. 26, 2007

Related U.S. Application Data

(60) Provisional application No. 60/679,570, filed on May 10, 2005.

(51) Int. Cl.
*H04M 3/42* (2006.01)
(52) U.S. Cl. .............. 379/202.01; 379/203.01; 379/204.01; 379/205.01; 379/206.01
(58) Field of Classification Search .......... 379/202.01, 379/203.01, 204.01, 205.01, 206.01; 705/9
See application file for complete search history.

(56) References Cited

U.S. PATENT DOCUMENTS

| | | | | | |
|---|---|---|---|---|---|
| 4,455,455 | A | * | 6/1984 | Little | 379/203.01 |
| 5,408,518 | A | * | 4/1995 | Yunoki | 379/202.01 |
| 6,275,575 | B1 | * | 8/2001 | Wu | 379/202.01 |
| 2004/0047461 | A1 | * | 3/2004 | Weisman et al. | 379/202.01 |
| 2007/0143168 | A1 | * | 6/2007 | Plas | 705/9 |

OTHER PUBLICATIONS

Nguyen, Hai Duong, "System and Method for Adding Conference Participants," filed Jan. 20, 2006, U.S. Appl. No. 11/336,452, Specification (39 pgs.) and Drawings (9 sheets).

* cited by examiner

*Primary Examiner*—Thjuan K Addy

(57) ABSTRACT

A system for establishing a conference call is provided. The system includes a handset operable to send a message containing a list of prospective participants for the conference call. The system also includes an application server operable to receive the message and invite at least some of the prospective participants. The application server is further operable, in response to receiving an acknowledgement from at least one of the prospective participants to participate in the conference call, to include the at least one of the prospective participants in the conference call.

20 Claims, 9 Drawing Sheets

INSTANT CONFERENCE METHOD AND APPARATUS

CROSS-REFERENCE TO RELATED APPLICATIONS AND CLAIM OF PRIORITY

The present invention is related to that disclosed in U.S. Provisional Patent Application Ser. No. 60/679,570, filed May 10, 2005, entitled "INSTANT CONFERENCE METHOD AND APPARATUS". U.S. Provisional Patent Application Ser. No. 60/679,570 is assigned to the assignee of the present application. The subject matter disclosed in U.S. Provisional Patent Application Ser. No. 60/679,570 is hereby incorporated by reference into the present disclosure as if fully set forth herein. The present invention hereby claims priority under 35 U.S.C. 119(e) to U.S. Provisional Patent Application Ser. No. 60/679,570.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure relates to telecommunications. More specifically, but not by way of limitation, a method and system are provided that facilitate the initiation and maintenance of conference calls.

BACKGROUND OF THE INVENTION

Voice conferencing and video conferencing are popular methods for three or more individuals to communicate with one another simultaneously. Setting up either type of conference call can be a cumbersome and time-consuming process. An organizer of a conference call might need to keep track of the phone numbers of all the participants in the call and might need to call each participant sequentially to bring each participant into the call. Establishing a conference call in this manner can be especially difficult for a mobile phone user who might be driving a car or might be otherwise preoccupied.

SUMMARY OF THE INVENTION

In one embodiment, a system for establishing a conference call is provided. The system includes a handset operable to send a message containing a list of prospective participants for the conference call. The system also includes an application server operable to receive the message and invite at least some of the prospective participants. The application server is further operable, in response to receiving an acknowledgement from at least one of the prospective participants to participate in the conference call, to include the at least one of the prospective participants in the conference call.

In another embodiment, a method for establishing a conference call is provided. The method includes selecting a plurality of prospective participants for the conference call. The method includes, in response to selecting to initiate the conference call, sending a signal to invite at least some of the plurality of prospective participants to participate in the conference call. The method includes at least some of the prospective participants signaling to participate in the conference call. The method also provides for including in the conference call the at least some of the prospective participants that signaled to participate.

In another embodiment, a system for establishing a conference call with a plurality of participants is provided. The system includes an application server operable to interact with a conference call organizer to receive a list of participants for the conference call. The application server also promotes inviting at least one of the participants to participate in the conference call. The application server is further operable to promote establishing the conference call between the conference call organizer and at least one of the participants in response to at least one of the participants signaling to participate in the conference call.

These and other features and advantages will be more clearly understood from the following detailed description taken in conjunction with the accompanying drawings and claims.

BRIEF DESCRIPTION OF THE DRAWINGS

For a more complete understanding of the presentation and the advantages thereof, reference is now made to the following brief description, taken in connection with the accompanying drawings in detailed description, wherein like reference numerals represent like parts.

DETAILED DESCRIPTION OF THE PREFERRED EMBODIMENTS

It should be understood at the outset that although an exemplary implementation of one embodiment of the present invention is illustrated below, the present system may be implemented using any number of techniques, whether currently known or in existence. The present disclosure should in no way be limited to the exemplary implementations, drawings, and techniques illustrated below, including the exemplary design and implementation illustrated and described herein, but may be modified within the scope of the appended claims along with their full scope of equivalents.

Embodiments of the present disclosure allow rapid and simple initiation and management of conference calls. Using a handset or similar telecommunications device, an organizer of a conference call can create a list of participants for the call, can select one or more predefined groups of participants, or can select a combination of one or more groups and one or more individual participants. Through the use of a single or simplified input on the handset, the organizer can then establish a conference call with all of the selected participants. After the conference call has been established, additional participants can easily be added.

Previously, conference calls might have been one of two types, an ad hoc conference call or a scheduled conference call. In an ad hoc conference call, an organizer might place a call to a first participant. After establishing communication with the first participant, the organizer might then push a 'hold' button or similar button on the organizer's telephone to put the first participant on hold. The organizer might then call a second participant and push a 'conference' button to bring the first and second participants into the conference call. The organizer might continue bringing in participants in this manner until all participants have been bridged into the conference call.

In a scheduled conference call, participants call into a telephone number at a pre-arranged time. The participants might then enter a code that allows them to be bridged into the conference call. If the organizer of the scheduled conference call wishes to add a participant after the call has been established, the organizer might dial a dial-out code, then dial the phone number of the additional participant, and then dial another code to bridge in the additional participant. This procedure might need to be repeated for each additional participant to be added.

Either type of previous conference call could present inconveniences. For an ad hoc conference call, a great deal of time might be needed to set up each participant individually in the call. For a scheduled conference call, adding more participants to an established call can be similarly time-consuming. For either type of call, a mobile telephone user might have additional difficulties in managing the names and telephone numbers of all of the participants.

Figure 1:
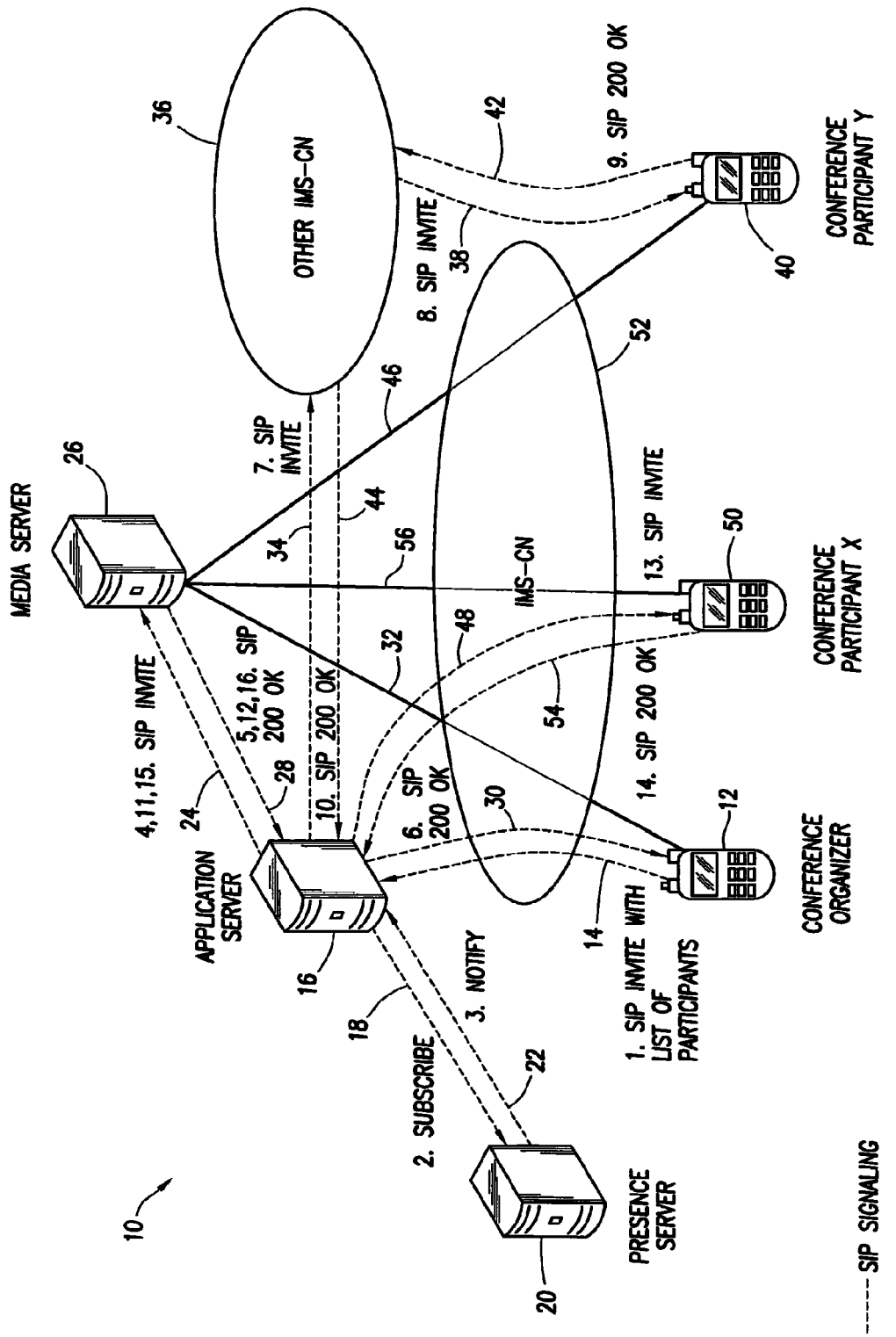
FIG. 1 illustrates a system for initiating an instant conference with an ad hoc list of participants according to an embodiment of the present disclosure.

FIG. 1 illustrates an embodiment of a system 10 that allows a conference call to be established with a list of participants with a single input, such as the push-of-a-button, or a substantially simplified input relative to inputs required by previous conference calling systems. The conference call might be a voice call or a video conference. A conference call established by means of such a system will be referred to herein as an instant conference, although it will be appreciated that there may be some delays and the conference call may not be created or connected instantaneously. In the embodiment of FIG. 1, a conference organizer 12 can use a mobile handset or phone or similar device to select a list of participants that the organizer 12 would like to include in the instant conference. That is, the set of participants in the instant conference is not a predefined group but is specified by the organizer 12 on an ad hoc basis at the time the instant conference is being arranged.

The organizer 12 might select the prospective participants from a buddy list, address book, or similar list of contacts. The selection might take place by selecting a prospective participant from a menu on the handset screen, by speaking the name of a prospective participant into a voice recognition system on the handset, or by some other means. Alternatively, the organizer 12 might manually enter a phone number of a prospective participant to be included in the instant conference. The participants may also be arranged into separate conference groups. When the group or list of prospective participants has been selected, the organizer 12 can initiate the conference calling process by pressing a button on the handset, by speaking an appropriate command into a voice recognition system on the handset, or by some other means. The methods of initiating the instant conference after the participants have been selected are described in more detail below.

When the organizer 12 takes the appropriate action to initiate an instant conference, a message 14 is sent from the organizer's handset to an application server 16. The message 14 contains the list of prospective participants that the organizer 12 has selected for inclusion in the instant conference. In an embodiment, the message 14 is a Session Initiation Protocol (SIP) INVITE message but in other embodiments other types of messages could be used. For ease of reference, the message 14 and the other messages described hereinafter will be referred to as SIP messages but it should be understood that other protocols and/or message types could be used for the messages.

After receiving the INVITE message 14, the application server 16 sends a SIP SUBSCRIBE message 18 to a presence server 20 requesting information regarding the availability of the selected prospective participants. The SUBSCRIBE message 18 contains the list of prospective participants that were included in the INVITE message 14 and also contains a request to be notified of the presence of the individuals on the list.

The presence server 20 has the capability to determine the availability of a user of a wireless telecommunications service. A user might select a 'do not disturb' or similar command when the user does not wish to accept calls. A user might also be in a location where wireless service is unavailable. The presence server 20 is capable of keeping track of whether users are unavailable for these or other reasons.

After receiving the SUBSCRIBE message 18, the presence server 20 sends a SIP NOTIFY message 22 to the application server 16 specifying which of the prospective participants listed in the SUBSCRIBE message 18 are available. The determination of the presence or absence of prospective participants prior to the invitation of the prospective participants into an instant conference can save time and resources by preventing the invitations from being sent to prospective participants that are unavailable. The use of the SUBSCRIBE message 18, the NOTIFY message 22, and the presence server 20 to determine the presence or absence of prospective participants can free the handset used by the organizer 12 from maintaining availability information on prospective participants. If a change occurs in the presence status of a prospective participant, only the presence server 20 needs to be updated, and the handset used by the organizer 12 does not need to be notified.

After receiving the NOTIFY message 22 containing the list of available prospective participants, the application server 16 sends a SIP INVITE message 24a to a media server 26. The INVITE message 24a requests that the organizer 12 be included in an instant conference mediated by the media server 26. If the media server 26 is able to include the organizer 12 in the instant conference, the media server 26 sends a SIP 2000K acknowledgement message 28a to the application server 16.

After receiving the 2000K message 28a, the application server 16 sends a SIP 2000K acknowledgement message 30 to the organizer 12. At this point, the media server 26 might establish a communication link 32 with the organizer 12. Alternatively, the communication link 32 between the media server 26 and the organizer 12 might be established at substantially the same time as communication links are established with the other participants in the instant conference. In an embodiment, the communication link 32 is based on the Real-Time Transport Protocol (RTP), but in other embodiments other protocols could be used.

The application server 16 might then begin attempting to bring other prospective participants into the instant conference. While the other prospective participants are described herein as being brought into the conference call sequentially, it should be understood that the prospective participants can be brought into the instant conference substantially simultaneously with each other. In some embodiments, the organizer may need to be brought into the conference first, and then the other participants may be brought in thereafter. For example, the organizer 12 handset may have a timer waiting for the 200OK response from the application server 16. If it takes too long to add the organizer 12 to the conference, the 200OK may expire and the organizer 12 handset may send a response to the application server 16 to terminate the conference while or before the other participants are added.

If a prospective participant is a member of a different network from the organizer 12, the application server 16 might send a SIP INVITE message 34 to the other network 36. The other network 36 might then send a SIP INVITE message 38 to conference participant Y 40, inviting conference participant Y 40 to join the instant conference set up by the organizer 12. If conference participant Y 40 accepts the invitation to join the instant conference, conference participant Y 40 sends a SIP 200OK acknowledgement message 42 to the other network 36. The other network 36 then sends a SIP 200OK acknowledgement message 44 to the application server 16.

The application server 16 then sends a SIP INVITE message 24b to the media server 26 requesting that conference participant Y 40 be included in the instant conference. If the media server 26 is able to include conference participant Y 40 in the instant conference, the media server 26 sends a SIP 200OK message 28b to the application server 16. Upon receiving the 200OK message 28b, the media server 26 might establish a communication link 46 with conference participant Y 40. Alternatively, the communication link 46 between the media server 26 and conference participant Y 40 might be established at substantially the same time as communication links are established with the other participants in the instant conference. The communication link 46 might be RTP-based.

The application server 16 might then begin attempting to bring into the instant conference a prospective participant that is a member of the same network as the organizer 12 by sending a SIP INVITE 48 to conference participant X 50 via network 52. If conference participant X 50 accepts the invitation to join the instant conference, conference participant X 50 sends a SIP 200OK message 54 to the application server 16. The application server 16 then sends a SIP INVITE message 24c to the media server 26 requesting that conference participant X 50 be included in the instant conference. If the media server 26 is able to include conference participant X 50 in the instant conference, the media server 26 sends a SIP 200OK message 28c to the application server 16.

Upon receiving the 200OK message 28c, the media server 26 might establish a communication link 56 with conference participant X 50. Alternatively, the communication link 56 between the media server 26 and conference participant X 50 might be established at substantially the same time as communication links are established with the other participants in the instant conference. The communication link 56 might again be RTP-based. The above-described manner of bringing prospective participants into the instant conference might continue until all prospective participants that wish to participate in the call have been included.

Figure 2:
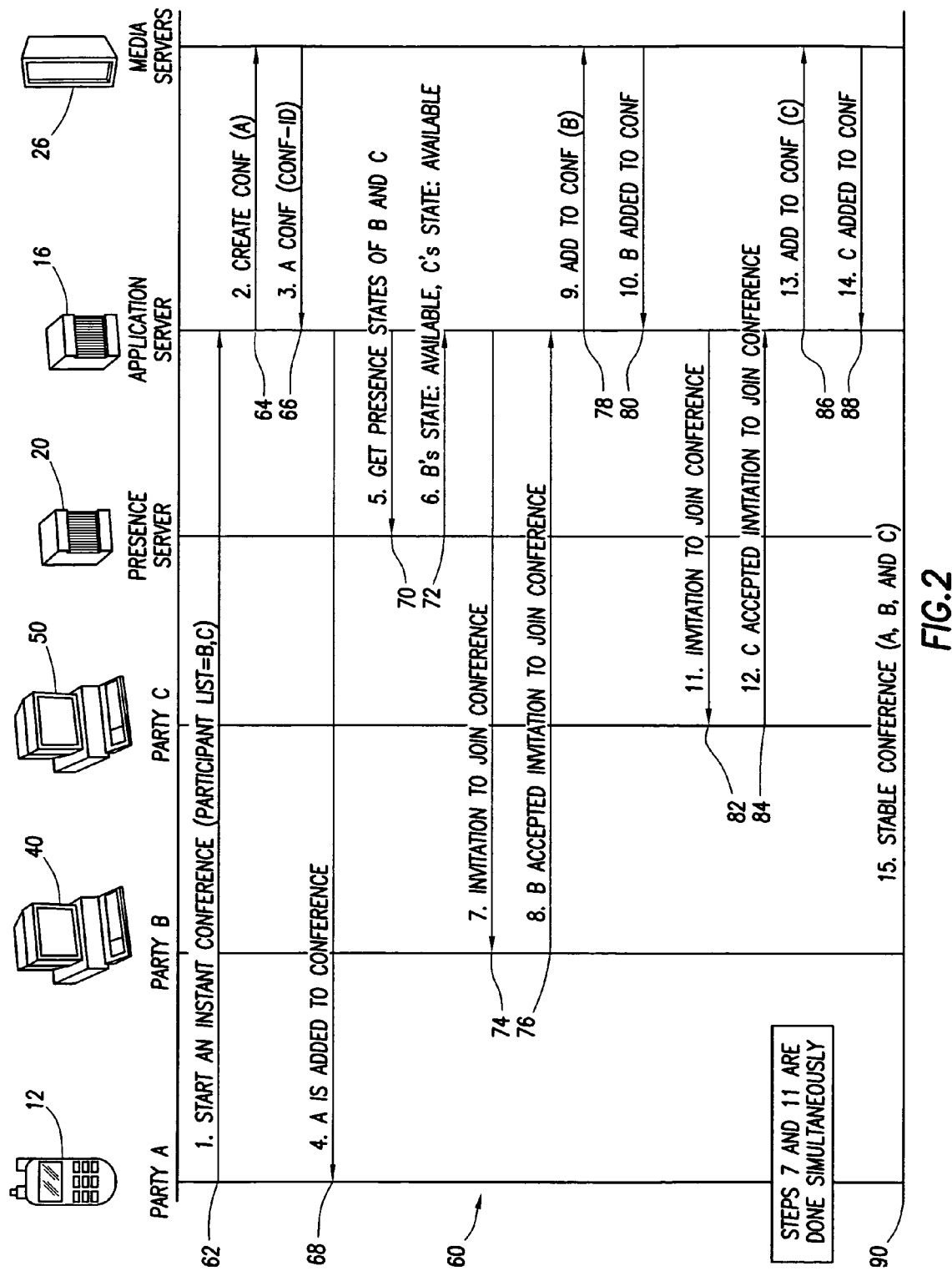
FIG. 2 illustrates a method for initiating an instant conference with an ad hoc list of participants according to an embodiment of the present disclosure.

FIG. 2 is a call flow diagram depicting an embodiment of a method 60 for establishing an instant conference for an ad hoc list of participants. In this example, party A 12 (which can be considered equivalent to the conference organizer 12 in FIG. 1) wishes to establish an instant conference with party B 40 and party C 50 (which can be considered equivalent to conference participant Y 40 and conference participant X 50 in FIG. 1, respectively). Party A 12 initiates the conference calling process in step 62 by sending an application server 16 a list of prospective participants in the instant conference.

In step 64, the application server 16 communicates with a media server 26 to attempt to create a conference call. In step 66, the media server 26 sends a conference ID to the application server 16. In step 68, the application server 16 adds party A 12 to the conference call.

In step 70, the application server 16 requests the presence states of party B 40 and party C 50 from a presence server 20. In step 72, the presence server 20 returns the presence states of party B 40 and party C 50. In this case, party B 40 and party C 50 are both available.

In step 74, the application server 16 sends an invitation to party B 40 to join the instant conference. In step 76, party B 40 accepts the invitation to join the instant conference. In step 78, the application server 16 communicates with the media server 26 to add party B 40 to the instant conference. In step 80, the media server 26 acknowledges to the application server 16 that party B 40 has been added to the instant conference.

In step 82, the application server 16 sends an invitation to party C 50 to join the instant conference. In step 84, party C 50 accepts the invitation to join the instant conference. In step 86, the application server 16 communicates with the media server 26 to add party C 50 to the instant conference. In step 88, the media server 26 acknowledges to the application server 16 that party C 50 has been added to the instant conference.

In step 90, a stable instant conference has been established among party A 12, party B 40, and party C 50. While the invitations to party B 40 and party C 50 depicted in steps 74 and 82, respectively, are shown happening sequentially, the invitations and subsequent steps would typically occur substantially simultaneously. The participant addition processes described in steps 74 through 80 and in steps 82 through 88 can be repeated as many times as necessary to bring in other participants that might have been selected by party A 12.

Figure 3:
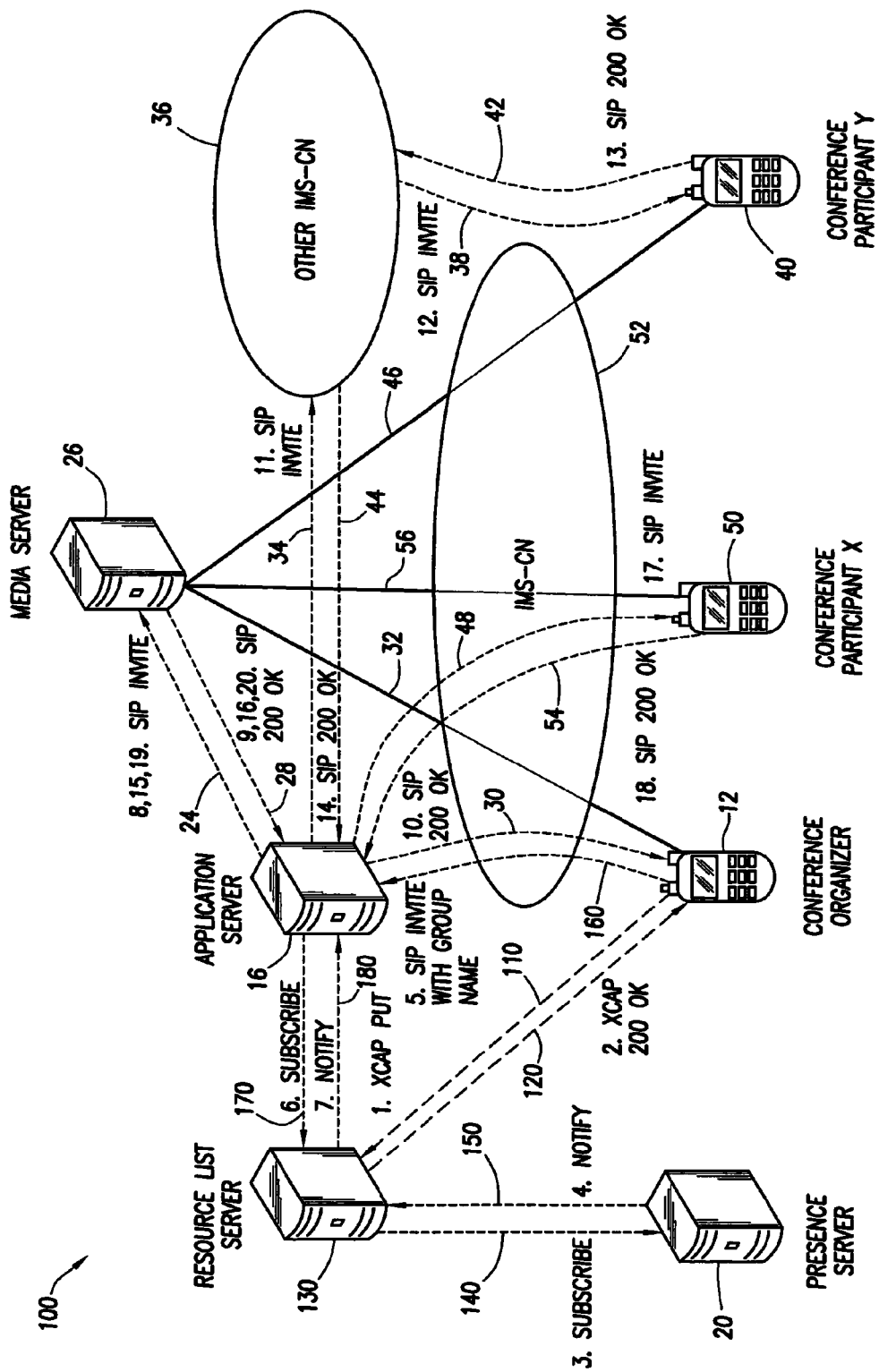
FIG. 3 illustrates a system for initiating an instant conference with a predefined group of participants according to an embodiment of the present disclosure.

FIG. 3 illustrates an embodiment of a system 100 that allows an instant conference to be established with one or more groups of participants substantially simultaneously. In this embodiment, a conference organizer 12 can create one or more groups of participants with which the organizer 12 might like to conduct an instant conference at some future time. For example, a sales manager might create a group that includes all of the manager's sales staff or a parent might create a group that includes the members of the parent's family.

When a group has been created, the organizer 12 can initiate an instant conference with all members of the group by pressing a button on a handset, by speaking an appropriate command into a voice recognition system on the handset, or by some other means. This system for establishing an instant conference with a predefined group of participants can be contrasted with the system depicted in FIG. 1, wherein the participants in an instant conference are specified by the organizer 12 on an ad hoc basis at the time the instant conference is being arranged.

The organizer 12 might select the members of a group from a buddy list, address or phone book, or similar list of contacts. The selection might take place by selecting a group member from a menu on the handset screen, by speaking the name of a group member into a voice recognition system on the handset, or by some other means. Alternatively, the organizer 12 might manually enter a phone number for a member of a group. Each group on the organizer's handset might be given a different name to distinguish the groups from one another. An individual might be a member of more than one group.

After selecting the members to be included in a group, the organizer 12 creates the group by sending a message 110 to a resource list server 130. In an embodiment, the message 110 is an XML Configuration Access Protocol (XCAP) PUT message, but in other embodiments other types of messages could be used. The message 110 informs the resource list server 130 of the name of the group and the members in the group. This information is then stored on the resource list server 130, freeing the handset of the organizer 12 from the need to store the information. Upon successfully receiving and storing the group information, the resource list server 130 sends an acknowledgement message 120 to the organizer 12. In an embodiment, the acknowledgement message 120 is an XCAP 200OK message, but in other embodiments other types of messages could be used.

After a group has been created, the resource list server 130 sends a SIP SUBSCRIBE message 140, or similar message, to a presence server 20. The SUBSCRIBE message 140 informs the presence server 20 that the resource list server 130 wishes to be notified of the availability of the members of the group. The presence server 20 then sends the resource list server 130 a SIP NOTIFY message 150, or similar message, informing the resource list server 130 of the status of the group members. In this manner, the resource list server 130 can maintain up-to-date information on the presence of the members of any group defined by the organizer 12.

When the organizer 12 wishes to initiate an instant conference with the members of a group, the organizer 12 selects one of the predefined groups by selecting a group from a menu on the handset screen, by speaking the name of a group into a voice recognition system on the handset, or by some other means. When a group has been selected, the organizer 12 can initiate the conference calling process by pressing a button on the handset, by speaking an appropriate command into a voice recognition system on the handset, or by some other means. The methods of initiating the instant conference after a group has been selected are described in more detail below.

The initiation of the conference calling process causes a SIP INVITE message 160 containing the name of the selected group to be sent from the organizer 12 to an application server 16. Upon receiving the INVITE message 160, the application server 16 sends a SIP SUBSCRIBE message 170 to the resource list server 130 requesting the availability status of the members of the selected group. Since the selected group was previously defined on the resource list server 130, the resource list server 130 is aware of the group members that are associated with the group name. The resource list server 130 returns a SIP NOTIFY message 180 informing the application server 16 which members are present.

The application server 16 then begins setting up an instant conference among the organizer 12 and the members of the group in a manner substantially similar to the manner described above in conjunction with FIG. 1. For example, if the organizer 12 defined the members of the group to be participant Y 40 and participant X 50, the INVITE messages 24 from the application server to a media server 26 and the 200OK messages 28 from the media server 26 to the application server 16 would be similar to those described above for participant Y 40 and participant X 50. The INVITE message 34, the INVITE message 38, the 200OK message 42, 200OK message 44, the INVITE message 48, and the 200OK message 54 would likewise be similar to those described above.

Figure 4:
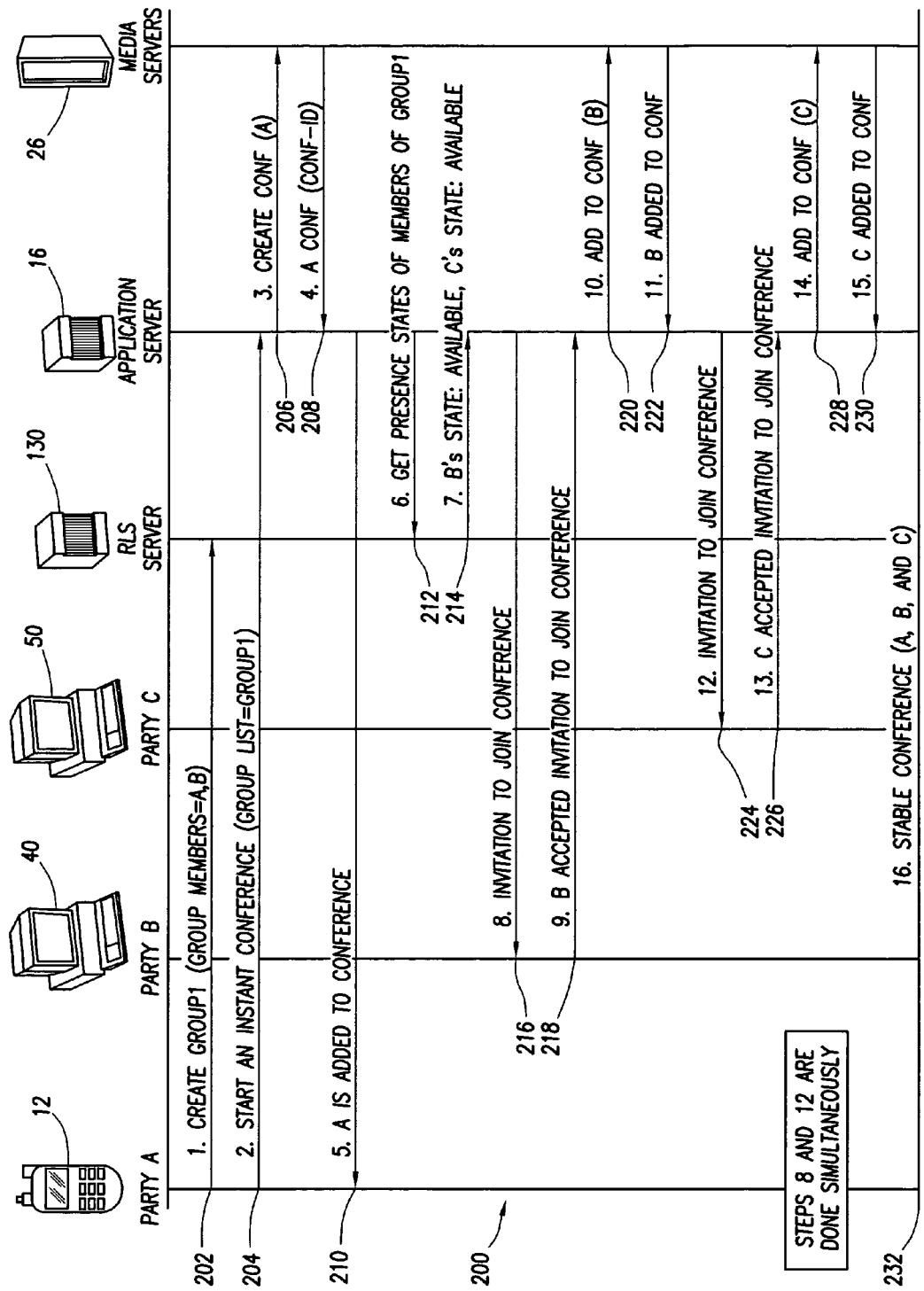
FIG. 4 illustrates a method for initiating an instant conference with a predefined group of participants according to an embodiment of the present disclosure.

FIG. 4 is a call flow diagram depicting an embodiment of a method 200 for establishing an instant conference with a predefined group of participants. In this example, party A 12 wishes to establish an instant conference with Group 1, which contains the members party B 40 and party C 50. Prior to initiating the instant conference, party A 12 creates Group 1, in step 202, by sending a message to an RLS server 130 specifying that Group 1 contains party B 40 and party C 50. In step 204, party A 12 starts the conference calling process by sending application server 16 a message specifying a list of groups to be included in the instant conference. In this case, the list of groups contains only Group 1.

In step 206, the application server 16 communicates with a media server 26 to attempt to create a conference call. In step 208, the media server 26 sends a conference ID to the application server 16. In step 210, the application server 16 adds party A 12 to the conference call.

In step 212, the application server 16 sends a message to the RLS server 130 requesting the presence states of the members of Group 1. In step 214, the RLS server 130 is aware that Group 1 contains party B 40 and party C 50 and returns the presence states of party B 40 and party C 50. In this case, party B 40 and party C 50 are both available.

In step 216, the application server 16 sends an invitation to party B 40 to join the instant conference. In step 218, party B 40 accepts the invitation to join the instant conference. In step 220, the application server 16 communicates with the media server 26 to add party B 40 to the instant conference. In step 222, the media server 26 acknowledges to the application server 16 that party B 40 has been added to the instant conference.

In step 224, the application server 16 sends an invitation to party C 50 to join the instant conference. In step 226, party C 50 accepts the invitation to join the instant conference. In step 228, the application server 16 communicates with the media server 26 to add party C 50 to the instant conference. In step 230, the media server 26 acknowledges to the application server 16 that party C 50 has been added to the instant conference.

In step 232, a stable instant conference has been established among party A 12, party B 40, and party C 50. While the invitations to party B 40 and party C 50 depicted in steps 216 and 224, respectively, are shown happening sequentially, the invitations and subsequent steps would typically occur substantially simultaneously. If the selected group had contained more members, the participant addition processes described in steps 216 through 222 and in steps 224 through 230 would be repeated as many times as necessary to bring the other members of the group into the instant conference.

One of skill in the art will recognize that the systems and methods described above can be combined into a single system and a single method that allows an instant conference to be established with one or more groups of participants and one or more individual participants. That is, a conference organizer might use a handset to select one or more predefined groups and one or more individuals that are not part of a group. An input mechanism on the handset, such as a button or a voice recognition system, could then be used to initiate an instant conference with the individuals and the members of the groups.

Other variations of the above systems and methods should also be apparent to one of skill in the art. For example, the present system, in one embodiment, may include a graphical user interface (GUI) on the mobile handset for use by an organizer to select a group and then de-select one or more members of the group so that an instant conference can be established with all the members of the group except those that were de-selected. Also using the GUI, an organizer might be able to establish an instant conference with an ad hoc list of participants and, upon completion of the instant conference, save the list as a new group.

Adding participants to an established conference call can be cumbersome under the prior art. For an ad hoc conference call, an organizer might need to press a 'conference' button to put the current participants on hold, call an additional participant, and again press the 'conference' button to bring the additional participant into the conference call. For a scheduled conference call, the organizer might need to dial a dial-out code, then dial the phone number of the additional participant, and then dial another code to bridge in the additional participant.

Embodiments of the present disclosure simplify the addition of new participants to an established conference call. After an instant conference has been established, a handset can be used to select an ad hoc list of new participants, one or more predefined groups of new participants, or a combination of an ad hoc list and one or more groups to be added to the instant conference. The addition of the selected participants to the instant conference can then be initiated through a single input into the handset.

Figure 5:
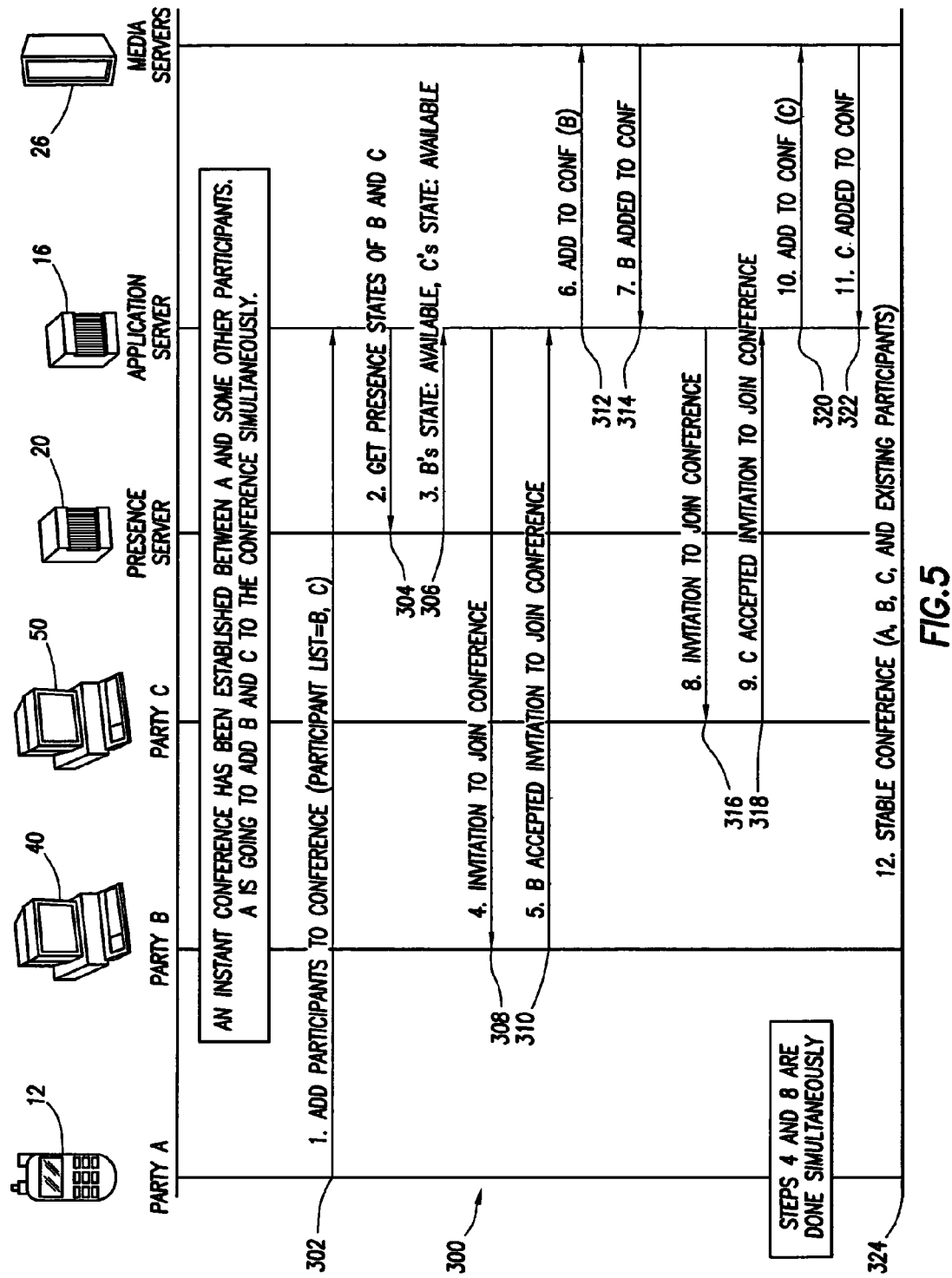
FIG. 5 illustrates a method for adding an ad hoc list of participants to an instant conference according to an embodiment of the present disclosure.

FIG. 5 is a call flow diagram depicting an embodiment of a method 300 for adding an ad hoc list of participants to an established instant conference. In this example, party A 12 wishes to add a list of participants, including party B 40 and party C 50, to an established instant conference. In step 302, party A 12 sends a message to an application server 16 containing a list of participants to be added to the instant conference. In an embodiment, the message is a SIP REFER message as described in detail below. In other embodiments, similar messages using other protocols could be used.

In step 304, the application server 16 requests the presence states of party B 40 and party C 50 from a presence server 20. In step 306, the presence server 20 returns the presence states of party B 40 and party C 50 to the application server 16. In this case, party B 40 and party C 50 are both available.

In step 308, the application server 16 sends an invitation to party B 40 to join the instant conference. In step 310, party B 40 accepts the invitation to join the instant conference. In step 312, the application server 16 communicates with a media server 26 to add party B 40 to the instant conference. In step 314, the media server 26 acknowledges to the application server 16 that party B 40 has been added to the instant conference.

In step 316, the application server 16 sends an invitation to party C 50 to join the instant conference. In step 318, party C 50 accepts the invitation to join the instant conference. In step 320, the application server 16 communicates with the media server 26 to add party C 50 to the instant conference. In step 322, the media server 26 acknowledges to the application server 16 that party C 50 has been added to the instant conference.

In step 324, a stable instant conference has been established among party B 40, party C 50, and the already present participants in the instant conference. While the invitations to party B 40 and party C 50 depicted in steps 308 and 316, respectively, are shown happening sequentially, the invitations and subsequent steps would typically occur substantially simultaneously. The participant addition processes described in steps 308 through 314 and in steps 316 through 322 can be repeated as many times as necessary to bring in other additional participants that might have been selected by party A 12.

Figure 6:
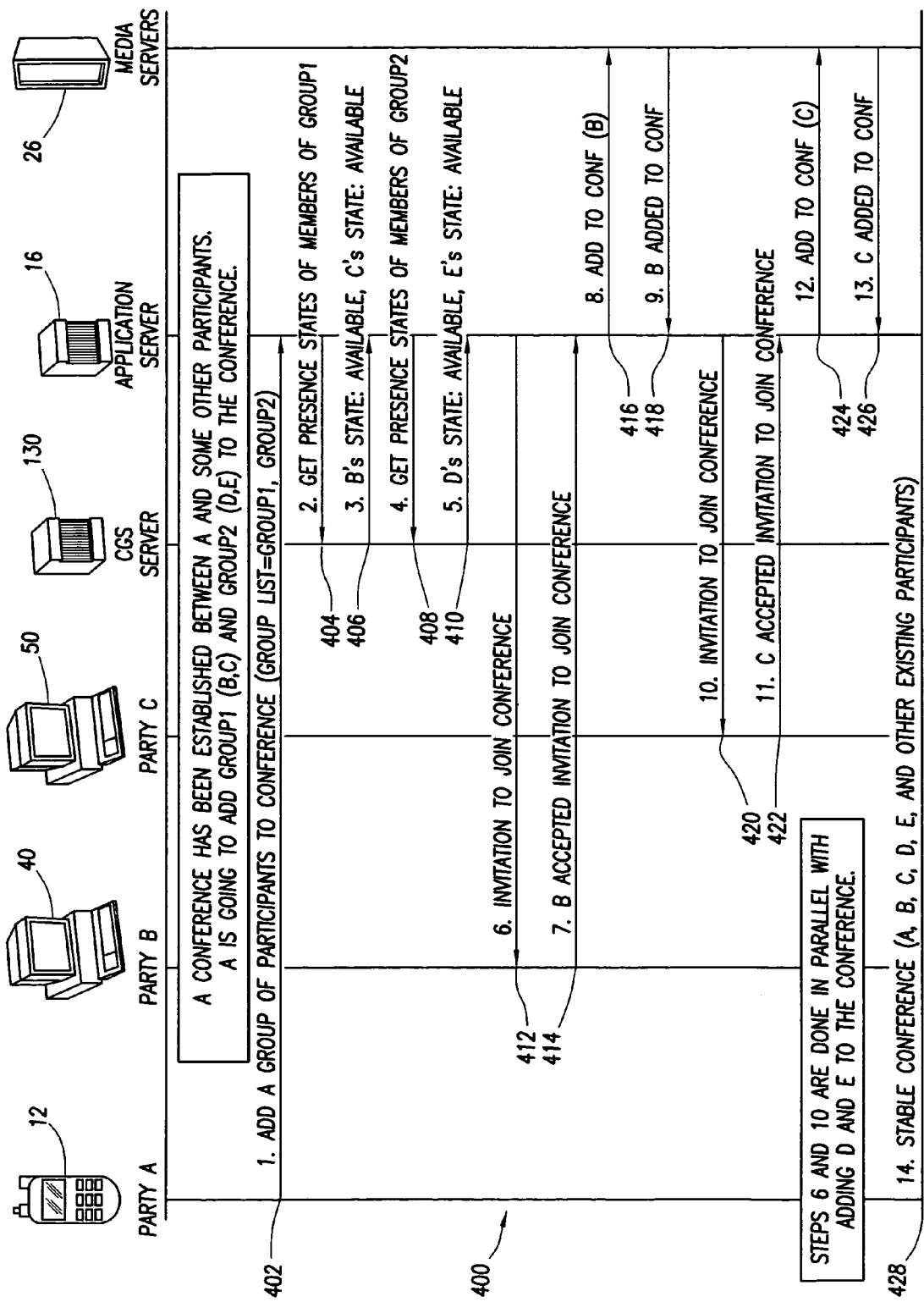
FIG. 6 illustrates a method for adding a predefined group of participants to an instant conference according to an embodiment of the present disclosure.

FIG. 6 is a call flow diagram depicting an embodiment of a method 400 for adding a predefined group of participants to an established instant conference. In this example, party A 12 wishes to add two groups of participants to an established instant conference. Group 1 includes party B 40 and party C 50 and Group 2 includes party D (not shown) and party E (not shown). In step 402, party A 12 sends a message to an application server 16 listing the groups to be added to the instant conference. In an embodiment, the message is a SIP REFER message as described in detail below. In other embodiments, similar messages using other protocols could be used.

In step 404, the application server 16 requests the presence states of the members of Group 1 from an RLS server, which in this case is referred to as a Conference Group Server (CGS) 130. In step 406, the CGS server 130 returns the presence states of party B 40 and party C 50 to the application server 16. In this case, party B 40 and party C 50 are both available. In step 408, the application server 16 requests the presence states of the members of Group 2 from the CGS server 130. In step 410, the CGS server 130 returns the presence states of party D and party E to the application server 16. In this case, party D and party E are both available.

In step 412, the application server 16 sends an invitation to party B 40 to join the instant conference. In step 414, party B 40 accepts the invitation to join the instant conference. In step 416, the application server 16 communicates with a media server 26 to add party B 40 to the instant conference. In step 418, the media server 26 acknowledges to the application server 16 that party B 40 has been added to the instant conference.

In step 420, the application server 16 sends an invitation to party C 50 to join the instant conference. In step 422, party C 50 accepts the invitation to join the instant conference. In step 424, the application server 16 communicates with the media server 26 to add party C 50 to the instant conference. In step 426, the media server 26 acknowledges to the application server 16 that party C 50 has been added to the instant conference.

The participant addition processes described in steps 412 through 418 and in steps 420 through 426 are repeated for party D and party E. In step 428, a stable instant conference has been established among party B 40, party C 50, party D, party E, and the already present participants of the instant conference. While the invitations to party B 40 and party C 50 depicted in steps 412 and 420, respectively, are shown happening sequentially, the invitations and subsequent steps would typically occur substantially simultaneously, as would similar steps for party D and party E.

Figure 7:
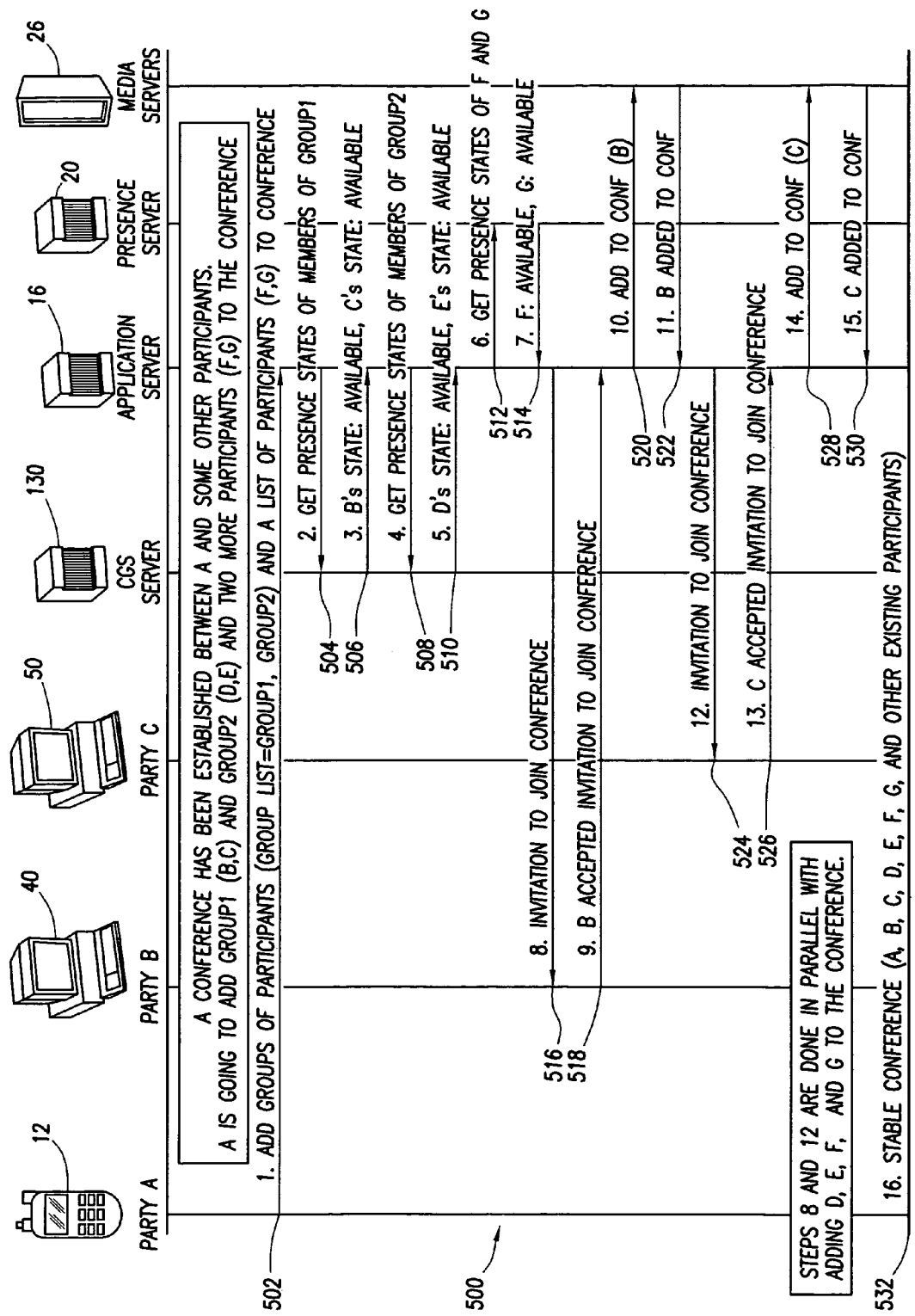
FIG. 7 illustrates a method for adding an ad hoc list of participants and a predefined group of participants to an instant conference according to an embodiment of the present disclosure.

FIG. 7 is a call flow diagram depicting an embodiment of a method 500 for adding an ad hoc list of participants and a predefined group of participants to an established instant conference. In this example, party A 12 wishes to add two groups of participants and two individual participants to an established instant conference. Group 1 includes party B 40 and party C 50 and Group 2 includes party D (not shown) and party E (not shown). The individual participants, party F and party G, are also not shown.

In step 502, party A 12 sends a message to an application server 16 containing a list of groups and individuals to be added to the instant conference. In an embodiment, the message is a SIP REFER message as described in detail below. In other embodiments, similar messages using other protocols could be used.

In step 504, the application server 16 requests the presence states of the members of Group 1 from an RLS server, which in this case is referred to as a CGS server 130. In step 506, the CGS server 130 returns the presence states of party B 40 and party C 50 to the application server 16. In this case, party B 40 and party C 50 are both available. In step 508, the application server 16 requests the presence states of the members of Group 2 from the CGS server 130. In step 510, the CGS server 130 returns the presence states of party D and party E to the application server 16. In this case, party D and party E are both available.

In step 512, the application server 16 requests the presence states of party F and party G from a presence server 20. In step 514, the presence server 20 returns the presence states of party F and party G to the application server 16. In this case, party F and party G are both available.

In step 516, the application server 16 sends an invitation to party B 40 to join the instant conference. In step 518, party B 40 accepts the invitation to join the instant conference. In step 520, the application server 16 communicates with a media server 26 to add party B 40 to the instant conference. In step 522, the media server 26 acknowledges to the application server 16 that party B 40 has been added to the instant conference.

In step 524, the application server 16 sends an invitation to party C 50 to join the instant conference. In step 526, party C 50 accepts the invitation to join the instant conference. In step 528, the application server 16 communicates with the media server 26 to add party C 50 to the instant conference. In step 530, the media server 26 acknowledges to the application server 16 that party C 50 has been added to the instant conference.

The participant addition processes described in steps 516 through 522 and in steps 524 through 530 are repeated for parties D, E, F, and G. In step 532, a stable instant conference has been established among party B 40, party C 50, party D, party E, party F, party G, and the already present participants of the instant conference. While the invitations to party B 40 and party C 50 depicted in steps 516 and 524, respectively, are shown happening sequentially, the invitations and subsequent steps would typically occur substantially simultaneously, as would similar steps for parties D, E, F, and G.

As mentioned previously, the message used to add participants to an established instant conference might be a SIP REFER message. Below is an example of SIP-compliant code that might be used for the REFER message when a list of individual participants and one or more predefined groups of participants are to be added to an established instant conference. It should be understood that this code is merely an example and that other coding syntax, other variable names, other programming languages, and other messaging protocols could be used to achieve similar functionality.

```
REFER sip:conf-123@imstest.com
From: <sip:Organizer@imstest.com>
To: < sip:conf-123@imstest.com>
Call-ID: 456
Content-Type: multipart/mixed;boundary="boundary1"
Content-Length: ...
--boundary1
Content-Type: application/resource-lists+xml
Content-Disposition: recipient-list
```

-continued

```
<?xml version="1.0" encoding="UTF-8"?>
    <resource-lists xmlns="urn:ietf:params:xml:ns:resource-lists"
        xmlns:xsi=http://www.w3.org/2001/XMLSchema-instance>
        <list>
            <entry uri="sip:E@imstest.com"/>
            <entry uri="sip:F@imstest.com"/>
        </list>
    </resource-lists>
--boundary1
Content-Type: application/resource-lists+xml
Content-Disposition: group-list
<?xml version="1.0" encoding="UTF-8"?>
<resource-lists xmlns="urn:ietf:params:xml:ns:resource-lists"
        xmlns:xsi=http://www.w3.org/2001/XMLSchema-instance>
        <list>
            <entry uri="Group1@imstest.com"/>
            <entry uri="Group2@imstest.com"/>
        </list>
    </resource-lists>
--boundary1
```

It can be seen that the first section of the body of the above message contains information about two individuals referred to as E@imstest.com and F@imstest.com and that the second section of the body contains information about two groups referred to as Group1@imstest.com and Group2@imstest.com. One of skill in the art will recognize that if a message with only a list of individuals is needed, only the first section of the body needs to be included and the second section of the body can be omitted. Similarly, if a message with only a list of groups is needed, only the second section of the body needs to be included and the first section of the body can be omitted.

A message similar to the above message might be used for the INVITE message used to initiate an instant conference. That is, a message with a similar format might be used for the INVITE message 14 shown in FIG. 1 for an, ad hoc list of participants or the INVITE message 160 shown in FIG. 3 for a predefined group of participants. One of skill in the art will recognize the modifications that might need to be made to transform the REFER message to an appropriate INVITE message.

As mentioned previously, a single input into a handset or other telecommunications device might initiate the establishment of an instant conference or the addition of a participant to an established instant conference. The input might be a spoken input into a voice recognition system on the handset, a selection of a menu item in the handset's display, the pressing of a button on the handset's keyboard, or some other type of input. For example, after selecting a list and/or group of prospective participants, an organizer might say the command 'voice' or the command 'video' to initiate an instant conference with the selected prospective participants. Alternatively, the organizer might select a 'voice' or 'video' menu item. Alternatively, a handset's keyboard might have dedicated keys for initiating an instant conference.

Figure 8:
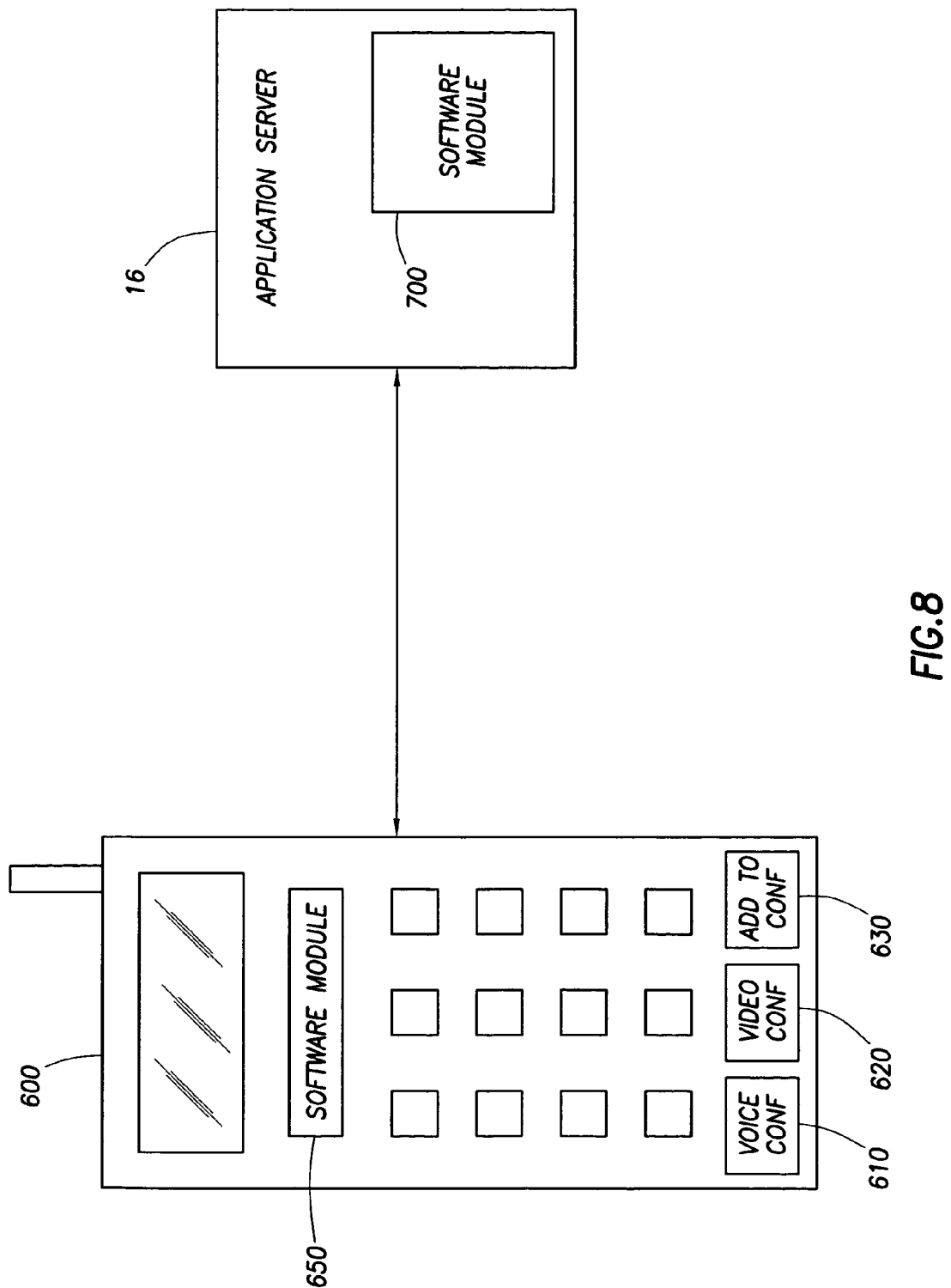
FIG. 8 illustrates a system for sending and receiving messages related to an instant conference according to an embodiment of the present disclosure.

FIG. 8 illustrates an embodiment of a handset 600 with dedicated buttons for initiating or adding to an instant conference. The handset 600 may be a mobile handset, mobile phone, wireless phone, personal digital assistant (PDA), mobile or portable computer, personal communication system or other device. In this embodiment, the handset 600 has a button 610 that can be pressed to initiate a voice instant conference, a button 620 that can be pressed to initiate a video instant conference, and a button 630 that can be pressed to add one or more participants to an established instant conference. When a button 610, 620, or 630 is pressed, a software module 650 in the handset 600 initiates the appropriate steps for establishing or adding to an instant conference. In other embodiments, the buttons 610, 620, and 630 may be provided on the screen of the handset 600 by the user interface, for example as soft buttons selectable by the user such as via a touch-screen. The user interface may provide the appropriate soft button depending on the state of the handset 600. For example before a conference, a soft button to initiate a video instant conference might be available. During a conference call, a soft button to add a conference participant may be available via the user interface, and so on.

A user, via the GUI, might use the handset 600 to select a list of individuals and/or a list of groups to be included in an instant conference. If the user wished to initiate a voice instant conference with the selected participants, the user could simply press the voice conference button 610 and the events described above for the initiation of an instant conference would take place. If the user wished to initiate a video instant conference with the selected participants, the user could simply press the video conference button 620 and the events described above for the initiation of an instant conference would take place. If the user wished to add the selected participants to an existing voice or video instant conference, the user could simply press the add to conference button 630 and the events described above for the addition of participants to an instant conference would take place.

In an embodiment, only the organizer of an instant conference has the capability of adding participants to the instant conference. In an alternative embodiment, any participant in an established instant conference with a handset 600 similar to that depicted in FIG. 8 could add participants to the instant conference. That is, a handset 600 with the appropriate software for creating a SIP REFER message as described above (or a message with similar functionality) could be used to add participants to an established instant conference regardless of whether the user of the handset 600 was the organizer of the instant conference or a participant added by the organizer.

When a handset 600 sends an INVITE message to initiate an instant conference or a REFER message to add a participant to an instant conference (or similar messages that perform similar functions), an application server 16 receives the message and a software module 700 in the application server 16 processes the message appropriately. For example, the software module 700 would be able to parse the message to determine the individuals and/or groups to be included in an instant conference. The software module 700 would then be able to initiate the appropriate steps for bringing the appropriate individuals and/or groups into the instant conference.

Figure 9:
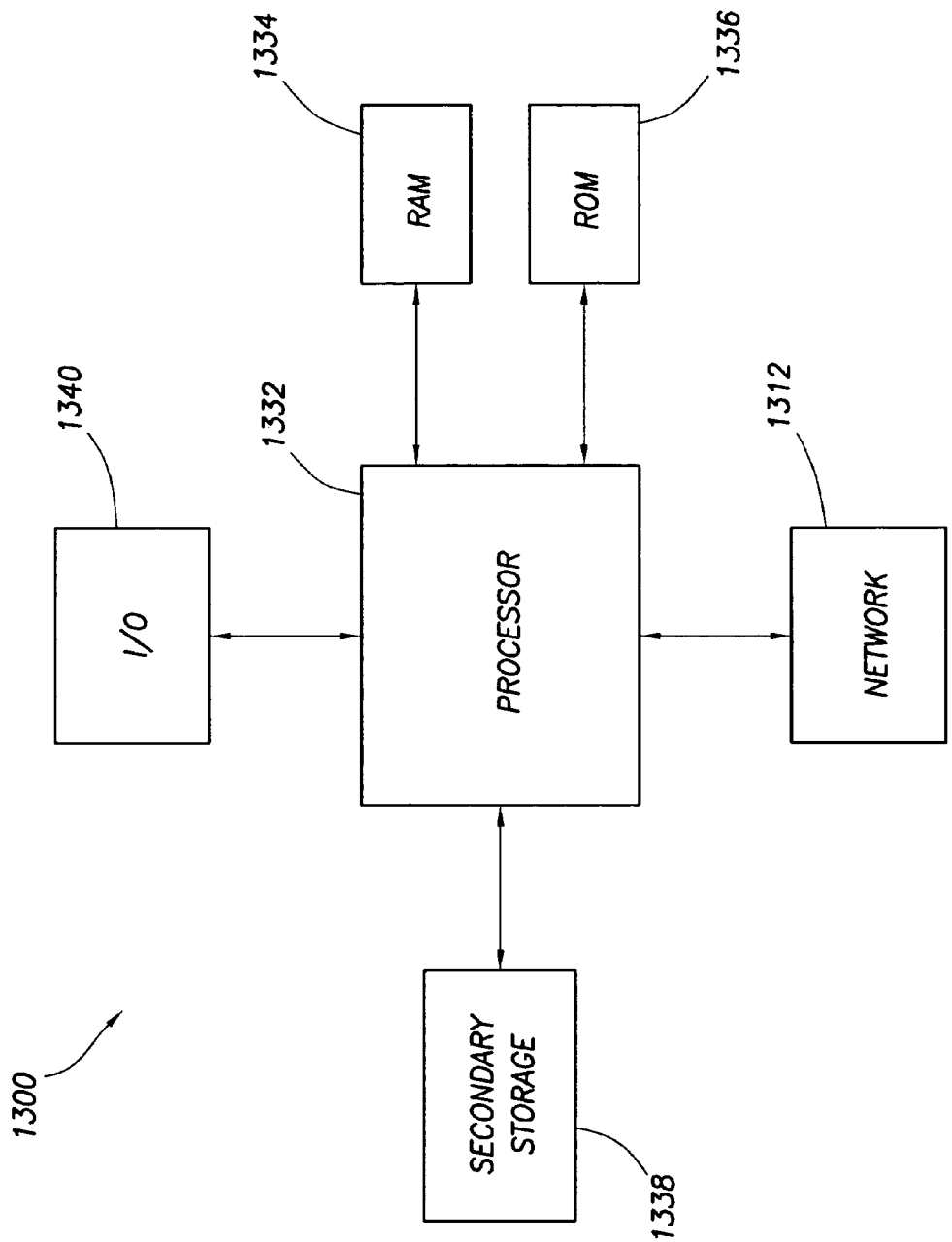
FIG. 9 is a block diagram of a computer system operable for some of the various embodiments of the present disclosure.

The system described above may be implemented on any general-purpose computer with sufficient processing power, memory resources, and network throughput capability to handle the necessary workload placed upon it. FIG. 9 illustrates a typical, general-purpose computer system suitable for implementing one or more embodiments disclosed herein. The computer system 1200 includes a processor 1332 (which may be referred to as a central processor unit or CPU) that is in communication with memory devices including secondary storage 1338, read only memory (ROM) 1336, random access memory (RAM) 1334, input/output (I/O) devices 1340, and network connectivity devices 1312. The processor 1332 may be implemented as one or more CPU chips.

The secondary storage 1338 is typically comprised of one or more disk drives or tape drives and is used for non-volatile storage of data and as an over-flow data storage device if RAM 1334 is not large enough to hold all working data. Secondary storage 1338 may be used to store programs that are loaded into RAM 1334 when such programs are selected for execution. The ROM 1336 is used to store instructions and perhaps data that are read during program execution. ROM 1336 is a non-volatile memory device that typically has a small memory capacity relative to the larger memory capacity of secondary storage. The RAM 1334 is used to store volatile data and perhaps to store instructions. Access to both ROM 1336 and RAM 1334 is typically faster than to secondary storage 1338.

I/O devices 1340 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 1312 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 1312 may enable the processor 1332 to communicate with the Internet or one or more intranets. With such a network connection, it is contemplated that the processor 1332 might receive information from a network or might output information to a network in the course of performing the above-described method steps.

Such information, which may include data or instructions to be executed using processor 1332 for example, may be received from and outputted to the network, for example, in the form of a computer data baseband signal or signal embodied in a carrier wave. The baseband signal or signal embodied in the carrier wave generated by the network connectivity devices 1312 may propagate in or on the surface of electrical conductors, in coaxial cables, in waveguides, in optical media, for example optical fiber, or in the air or free space. The information contained in the baseband signal or signal embodied in the carrier wave may be ordered according to different sequences, as may be desirable for either processing or generating the information or transmitting or receiving the information. The baseband signal or signal embodied in the carrier wave, or other types of signals currently used or hereafter developed, referred to herein as the transmission medium, may be generated according to several methods well known to one skilled in the art.

The processor 1332 executes instructions, codes, computer programs, or scripts that it accesses from hard disk, floppy disk, optical disk (these various disk-based systems may all be considered secondary storage 1338), ROM 1336, RAM 1334, or the network connectivity devices 1312.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A system for establishing a conference call comprising:
a network connectivity device in an application server configured to receive, from a handset, a request message containing a list of prospective participants for the conference call and send an invite message containing a list of available participants to whom conference call invitations are sent, the conference call being an instant conference call, the available participants being a subset of prospective participants that are available to connect to the instant conference call; and
a processor in the application server operable execute a software module that is configured to process the received request message and invite at least one of the prospective participants, the application server further operable, in response to receiving an acknowledgement from at least one of the prospective participants to participate in the conference call, to include the at least one of the prospective participants in the conference call.

2. The system of claim 1, further comprising a presence server operable to inform the application server regarding a presence of at least one of the prospective participants.

3. The system of claim 2, wherein when the application server is informed of an absence of the at least one of the prospective participants, the application server does not invite the at least one of the prospective participants to join the conference call.

4. The system of claim 1, further comprising a resource list server operable to inform the application server regarding the presence of a member of a group of prospective participants.

5. The system of claim 1, wherein the list of prospective participants is further defined as one of:
an ad hoc list created substantially contemporaneously with the conference call; and
a group of prospective participants created prior to the time of the conference call.

6. A method for establishing a conference call comprising:
receiving, at an application server, a message from a handset, the message containing a list of prospective participants for the conference call, the conference call being an instant conference call;
in response to receiving the message, sending a signal to invite a list of available participants to participate in the conference call, the list available participants comprising a subset of prospective participants that are available to connect to the instant conference call;
receiving an acknowledgement from at least one of the subset of the list of the prospective participants signaling to participate in the conference call; and
including in the conference call the at least one of the subset of the list of the prospective participants that signaled to participate.

7. The method of claim 6, further comprising:
interacting with a media server to create the conference call;
receiving at the application server a confirmation from the media server that the conference call has been created;
adding a first party to the conference call, wherein the first party corresponds to the handset from which the message containing the list of prospective participants was received;
requesting from a presence server an availability status of at least some of the list of prospective participants;
receiving, at the application server, from the presence server the availability status of the at least some of the list of prospective participants, wherein the availability status determines the list of available participants that are invited to participate in the conference call;
in response to receiving the acknowledgement from at least one of the list of available participants, interacting with the media server to add the at least one of list of available participants to the conference call; and
receiving from the media server a confirmation that the at least one of the list of available participants has been added to the conference call.

8. The method of claim 6, wherein, when the list of prospective participants is a predefined group of participants, the application server requests the availability status of a member of the group from a resource list server.

9. The method of claim 6, wherein the list of prospective participants is created by at least one of:
selecting an individual participant from a list of contacts;
selecting a group of participants from a list of groups;
speaking a name of an individual participant into a voice recognition system; an
speaking a name of a group of participants into a voice recognition system.

10. The method of claim 6, wherein sending the signal to invite the list of available participants to participate in the conference call is initiated by at least one of:
selecting a command from a list of commands;
speaking a command into a voice recognition system; and
pressing a button on a handset.

11. The method of claim 7, wherein communication between the application server and the first party, between the application server and the media server, between the application server and the presence sever, and between the application server and the at least one prospective participant occurs via the Session Initiation Protocol.

12. The method of claim 7, wherein communication between the media server and the handset occurs via the Real-Time Transport Protocol.

13. A system for establishing a conference call with a plurality of participants comprising:
an application server configured to interact with a conference call organizer to receive a message that comprises a list of prospective participants for the conference call and to promote inviting a list of available participants to participate in the conference call, the list available participants comprising a subset of prospective participants that are available to connect to the instant conference call, the application server further operable to promote establishing the conference call between the conference call organizer and at least one of the available participants in response to the at least one of the available participants signaling to participate in the conference call, and the conference call being an instant conference call.

14. The system of claim 13, wherein the application server is further configured to send a request to a media server to establish a communication link with the available participants.

15. The system of claim 14, wherein the application server is further configured to send a confirmation to the organizer when a communication link has been established between the media server and the conference call organizer.

16. The system of claim 13, wherein the application server is further configured to send an invitation to the available participants into the conference call and receive an acceptance to the invitation to the conference call from the available participants.

17. The system of claim 13, further comprising a presence server operable to maintain availability status information related to each of the listed participants and operable to provide the availability status information to the application server.

18. The system of claim 13, further comprising a handset used by the conference call organizer to select and communicate the list of prospective participants to the application server, the handset selected from a group consisting of mobile handsets, mobile phones, wireless phones, personal digital assistants (PDAs), and personal communication systems.

19. The system of claim 18, further comprising a graphical user interface on a display of the handset operable to promote creation of the list of prospective participants, and further comprising a component on the handset operable to initiate the conference call.

20. The system of claim 19, wherein the component is one of:
   a keyboard key on the handset; and
   a voice recognition component on the handset operable to promote initiation of the conference call in response to a voice command.

* * * * *